United States Patent

[11] 3,548,930

[72] Inventor Ambrose W. Byrd
  Huntsville, Ala.
[21] Appl. No. 845,974
[22] Filed July 30, 1969
[45] Patented Dec. 22, 1970
[73] Assignee The United States of America as represented by the Administrator of the National Aeronautics and Space Administration

[54] ISOTHERMAL COVER WITH THERMAL RESERVOIRS
  11 Claims, 4 Drawing Figs.
[52] U.S. Cl. .................................. 165/105,
  165/104, 165/133, 244/1, 219/378, 219/530
[51] Int. Cl. .................................. F28d 15/00
[50] Field of Search .................................. 165/105,
  104, 133; 244/1; 219/378, 530, 540

[56] References Cited
  UNITED STATES PATENTS
  2,342,211  2/1944  Newton .................. 165/105X
  2,825,034  2/1958  Birchard ................ 165/104X
  3,152,774 10/1964  Wyatt ................... 244/1
  3,450,195  6/1969  Schnacke ............... 165/105X
  3,490,718  1/1970  Vary ................... 165/105X OTHER REFERENCES
  Katzoff, S., Proceedings of Joint Atomic Energy Commission/Sandia Laboratories Heat Pipe Conference, Space Isotope Power Department, Sandia Laboratories, Vol.1, Oct., 1966 pp 72 to 74 (micro fische)

Primary Examiner—Albert W. Davis, Jr.
Attorneys—L. D. Wofford, Jr., G. J. Porter and G. T. McCoy ABSTRACT: An isothermal cover for a spacecraft. The device is a double-walled cylinder enclosing a number of containers of fusible material, mounted on struts inside the walls of the cylinder, for use as heat reservoirs. The inside surfaces of the cylinder and the outside surfaces of the containers and struts are covered with a wicking material. The struts may also be fabricated solely of the wicking material. The cavity of the double-walled cylinder also contains a heat transfer fluid. The device functions as a heat pipe in transferring heat from its sunlit to its other (dark) side. The heat reservoirs store heat when the device is in sunlight and return the heat to the system when the device is in darkness. Electrical heaters also furnish heat to the system if needed to keep the system at constant temperature.

PATENTED DEC 22 1970

3,548,930

INVENTOR
AMBROSE W. BYRD

BY
*H. McCoy*
*George J. Porter*
ATTORNEYS

ISOTHERMAL COVER WITH THERMAL RESERVOIRS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates to equipment covers and more particularly to a constant-temperature isothermal cover for a spacecraft.

2. Description of the Prior Art

The technical fields of heating and refrigeration are old established fields with many and diverse types of equipment. Most of the systems for temperature control which have been used extensively in the past are expensive, heavy and consume large amounts of fuel or electrical power. However, the advent of the space age has brought changed design requirements for temperature control systems, particularly those used for space vehicles. Spacecraft systems for controlling temperature must be lightweight, with requirements for electrical power minimized as much as possible.

A specific problem relating to temperature control in spacecraft is that one side of the craft may be in direct sun light while the opposite side is shaded. This causes overheating on one side of the craft and creates a requirement for balancing the skin temperature over the whole surface of the spacecraft. This was accomplished during the recent Apollo 8 trip to the moon and around the moon by slowly rotating the spacecraft around an axis perpendicular to the sun's rays so that all sides of the spacecraft were exposed to the sun light during a period of about an hour.

A specific problem relating to temperature control of spacecraft in earth orbit or in orbit around other planets is that the spacecraft is in daylight part of the time and darkness part of the time. This creates a requirement for dissipation of heat during the time the spacecraft is being heated by the sun's rays and a requirement for heating the spacecraft while it is in darkness.

Some types of space equipment require a cover which provides isothermal or constant-temperature isothermal conditions. One type of space equipment requiring the latter type of cover is a space telescope. A space telescope is a precision optical instrument which must be protected from temperature change or temperature differentials in its various parts. Its optical parts must be protected from damage. Furthermore, its metal parts must be protected from expansion or contraction caused by temperature extremes so that the focal length of the instrument does not change.

SUMMARY OF THE INVENTION

Accordingly, it is an object of this invention to provide an improved cover for space equipment providing control of the temperature of the equipment.

A further object of the invention is to provide an improved cover for space equipment which is substantially isothermal, even when one side of the cover is being heated by sun light.

Yet another object of this invention is to provide an improved cover for space equipment which will efficiently maintain constant-temperature conditions for the equipment, even when the cover is exposed to variable temperature conditions, by providing a capability to store heat at times and return the stored heat to the system at other times.

These and other objects are accomplished in the present invention which provides a double-wall enclosure, at least one container of fusible material mounted inside the enclosure, wicking material covering the interior surfaces of the enclosure and the exterior surfaces of each container and a heat transfer fluid contained within the enclosure. The fusible material acts as a thermal reservoir for storing heat, which is returned to the system when the heat is needed to maintain a constant-temperature condition in the cover. The heat transfer fluid and the wicking material enable the cover to act as a heat pipe in efficiently transferring heat from one side of the device to its other side or to the fusible material.

BRIEF DESCRIPTION OF THE DRAWINGS

The invention will be more fully understood by the following detailed description when taken together with the accompanying drawings in which.

DESCRIPTION OF THE PREFERRED EMBODIMENT

Figure 1:
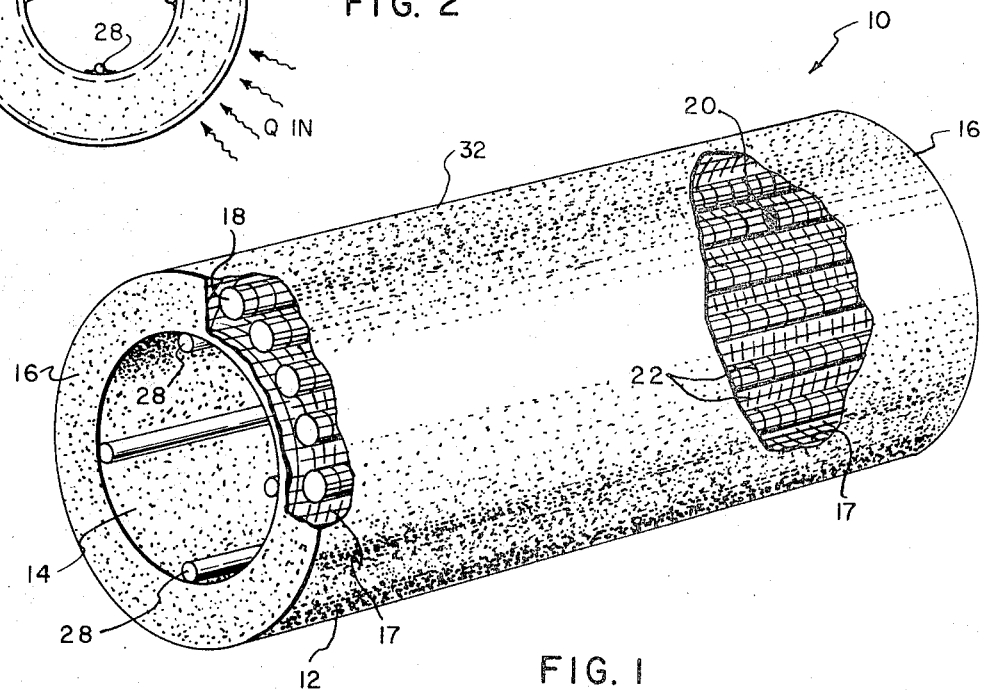
FIG. 1 is an isometric view of one embodiment of the invention.

With continued reference to the accompanying FIGS. wherein like numerals designate similar parts throughout the various views and with initial attention directed to FIG. 1, there is illustrated a typical embodiment of the invention in the form of an isothermal barrel for a space telescope, designated generally by the numeral 10. The barrel 10 comprises a double-wall cylindrical enclosure having an outer wall 12 and inner wall 14 and two end walls 16, all of which enclose a cavity 17. Mounted within the cavity 17 of barrel 10 are one or more enclosed containers 18 of a fusible material 20, which, for example, may be octocosane or another hydrocarbon of the paraffin series. These substances were chosen for this purpose because they have melting points in the range of 80° F to 200° F, and a relatively high heat of fusion, which gives them good heat storage capabilities. In practicing the present invention a particular paraffin which has a melting temperature of interest to the user may be chosen. Barrel 10 preferably includes a plurality of containers 18 which are spaced equally around the cavity 17 of space telescope barrel 10.

Figure 2:
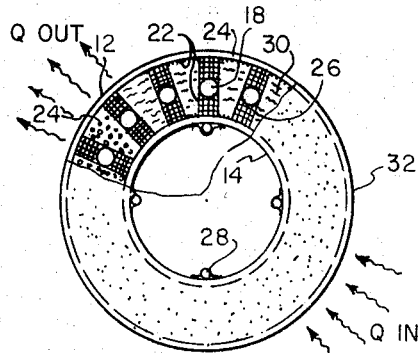
FIG. 2 is an end view of the invention shown in FIG. 1 with one end of the cover enclosure open.

The inside surface of walls 12 and 14, ends 16 and the outside surface of containers 18 are all covered with a wicking material 22, which may be 100—300 mesh screen, or a number of other known wicking materials. As may be seen in FIG. 2, the enclosed cavity 17 formed by the walls 12 and 14 and ends 16 of the space telescope contains a heat transfer fluid 24, which may be water, freon, alcohol or a number of other substances which are easily vaporized. The construction of the space telescope barrel 10 with its interior surfaces covered with the wicking material 22 and with the cavity of the barrel 10 containing heat transfer fluid 24 enables the space telescope barrel 10 to function as one large heat pipe so as to utilize the latent heat of vaporization of the working fluid to transfer heat from one side of the barrel 10 to its other side, in accordance with known principles of operation of a heat pipe.

As may be seen in FIGS. 1 to 4, the metal outer wall 12 of the space telescope barrel 10 may be covered by a thin thermal coating 32. Depending upon the mission of the particular space equipment involved, the environment involved and the desires of the user, coating 32 may have either heat absorbing or heat reflecting characteristics, combined with either high or low emissitivity properties. The absorptivity ($\alpha$) of the coating is chosen on the basis of the predominant solar wavelength of 0.6 microns, while the emissitivity ($\epsilon$) aspect of the coating is based upon the designed temperature of operation, considering all heat sources and sink temperatures within the environment. $\alpha/\epsilon$ ratios are thus temperatures dependent and can be greater or less than 1. Thermal coatings which may be used as a part of the invention are already known. Since they may take various forms and are not considered novel per se, they will not be described in detail herein.

Figure 3:
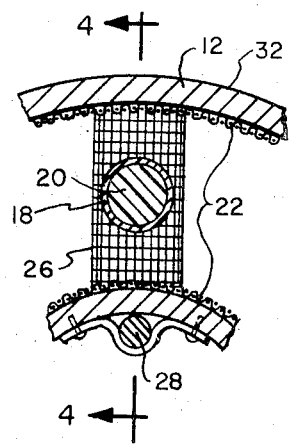
FIG. 3 is an enlarged sectional view of a portion of the invention shown in FIG. 1.
Figure 4:
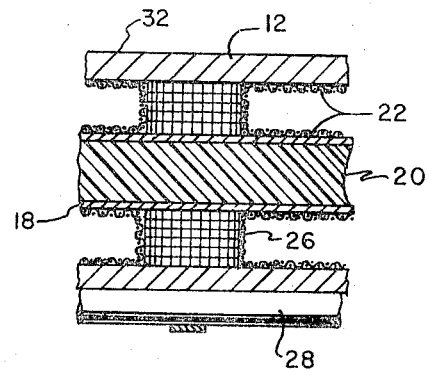
FIG. 4 is an enlarged sectional view of the invention shown in FIG. 1, taken along line 4—4 of FIG. 3.

Containers 18 are constrained and supported by ends 16 and by standoffs or struts 26. Struts 26 may be seen in the open end view of telescope barrel 10 shown in FIG. 2. Struts 26 serve the function of helping to support containers 18 in a position midway between outer wall 12 and inner wall 14, so that containers 18 are spaced from, and do not touch, walls 12 and 14. Struts 26 may be fabricated of wicking material 22, or, if they are required to carry a substantial portion of the weight of containers 18, they may also be made of any desired rigid structure and covered by wicking material 22. An additional function required of struts 26 is to furnish free communication for the coolant from inner wall 14 to outer wall 12. On the outside of inner wall 14 are several heaters 28, which may be of the electrical calrod type, or other known types. FIGS. 3 and 4 show additional details of the interior construction of this embodiment of the invention.

One cycle of operation of the isothermal space telescope barrel 10 follows:

When the sun light heats the outer wall 12 of space telescope barrel 10, the heat is absorbed by outer wall 12 and conducted to the inside of outer wall 12. There heat transfer fluid 24 absorbs heat and is vaporized. The vapor 30 then moves under vapor pressure through the cavity 17 of barrel 10 between and around containers 18 to the opposite (shaded) side of the interior cavity 17 of spacecraft barrel 10. The vapor 30 then condenses back to fluid 24 and forms drops of fluid 24 on wicking material 22 positioned on the inner sides of the walls 12 and 14, ends 16 and the outer walls of cans 18 and struts 26. The fluid 24 (condensate) then moves by means of capillary flow through the wicking material 22 back to the sunny side of outer wall 12 where it absorbs more heat and starts the cycle over. In condensing, vapor 30 gives up heat which is absorbed by walls 12 and 14, ends 16 and containers 18. Thus heat is distributed evenly and practically instantaneously to all parts of the surfaces of walls 12 and 14 and ends 16 so as to maintain spacecraft barrel 10 substantially isothermal.

During the time spacecraft barrel 10 is transferring heat from its heated side to its cold side, as described above, fusible material 20 contained in containers 18 is absorbing heat and changing from the solid to the liquid state. Thus, each container 18 acts as a thermal reservoir by absorbing heat. Then, whenever the heated spacecraft barrel 10 passes into darkness or otherwise enters a colder environment, fusible material 20 may change back to the solid state and give off heat which is returned to the system to efficiently and economically maintain it in a substantially constant-temperature condition, regardless of the source of the input energy, as long as the fusible material remains partially in the liquid state and partially in the solid state. Of course, if the fusible material becomes completely liquid or completely solid, then the isothermal temperature may rise or fall. If the system should need additional heat to maintain it at a substantially constant temperature, heaters 28 may be used with an onboard power supply (not shown) to produce heat as needed.

The invention disclosed herein may be modified so that it can be used as a heater attached to another space vehicle which requires heat but is unable to maintain its longitudinal axis normal to the rays of the sun. This "space vehicle heater" can have its longitudinal axis normal to the craft to be heated and substantially normal to the rays of the sun. Vapor from the "heater" is piped into the heated craft, which may itself be a double-walled heat pipe. The latter craft is heated by the latent heat of vaporization released by condensation of the vapor piped in. The condensate is then wicked back to the heater device through piping. Thermal coatings and shutters may be used as desired, on both the heater and the heated craft, to minimize heat losses to the environment.

From the foregoing it may be seen that applicant has invented a novel type of constant-temperature isothermal spacecraft cover, one application of which is as a barrel for a space telescope. The double-wall, "heat pipe" construction of this invention could have made the rotation of spacecraft, as discussed under Description of the Prior Art above, unnecessary. The invention preferably includes thermal heat reservoirs which store heat at times and return heat to the system at other times. The result is the saving of much heat energy which would otherwise be dissipated and wasted. This minimizes the necessity to use conventional heater equipment to maintain the space telescope barrel at a constant temperature, thus saving electrical power, which is expensive and precious in a space environment.

I claim:

1. An isothermal cover for space equipment comprising:
   a. a double-walled enclosure having an inner wall and an outer wall;
   b. at least one container of fusible material mounted inside said enclosure, for absorbing and storing heat energy and returning said heat energy to said enclosure when it is needed to maintain the temperature of said enclosure;
   c. a heat transfer fluid contained within said enclosure, for transferring heat from a first side of said enclosure to the opposite side of said enclosure;
   d. wicking material covering the interior surfaces of said enclosure and the exterior surfaces of each said container, for returning said heat transfer fluid from said opposite side of said enclosure to said first side of said enclosure, at least one heater mounted on the outside surface of said inner wall, for maintaining said enclosure at a constant temperature.

2. The isothermal cover for space equipment of claim 1 wherein said double-wall enclosure comprises:
   a. an outer cylindrical wall;
   b. an inner cylindrical wall;
   c. two end walls connecting together said outer and inner walls at their opposite ends.

3. The isothermal cover for space equipment of claim 2 wherein each said container of fusible material is a closed container.

4. The isothermal cover for space equipment of claim 3 comprising at least one strut contained within said enclosure, each said container of fusible material being mounted on said end walls and on at least one said strut.

5. The isothermal cover for space equipment of claim 4 wherein each said strut comprises wicking material.

6. The isothermal cover for space equipment of claim 5 wherein a plurality of said containers of fusible material are spaced equidistant around the circumference of the interior cavity of said enclosure and are mounted midway between the said inner an and outer walls of said enclosure.

7. The isothermal cover for space equipment of claim 6 comprising at least one heater mounted on the outside surface of said inner cylindrical wall, for maintaining said enclosure at a constant temperature.

8. The isothermal cover for space equipment of claim 7 comprising a heat-absorbing coating applied to the outer surface of the said outer cylindrical wall.

9. The isothermal cover for space equipment of claim 7 comprising a heat-reflecting coating applied to the outer surface of the said outer cylindrical wall.

10. The isothermal cover for space equipment of claim 8 wherein each said strut comprises a rigid structure having said wicking material as an outer cover.

11. The isothermal cover for space equipment of claim 9 wherein each said strut comprises a rigid structure having said wicking material as an outer cover.